July 7, 1970   N. N. KAPITANOV ET AL   3,519,187
INSTRUMENT FOR SUTURING VESSELS
Filed Dec. 6, 1966   7 Sheets-Sheet 1

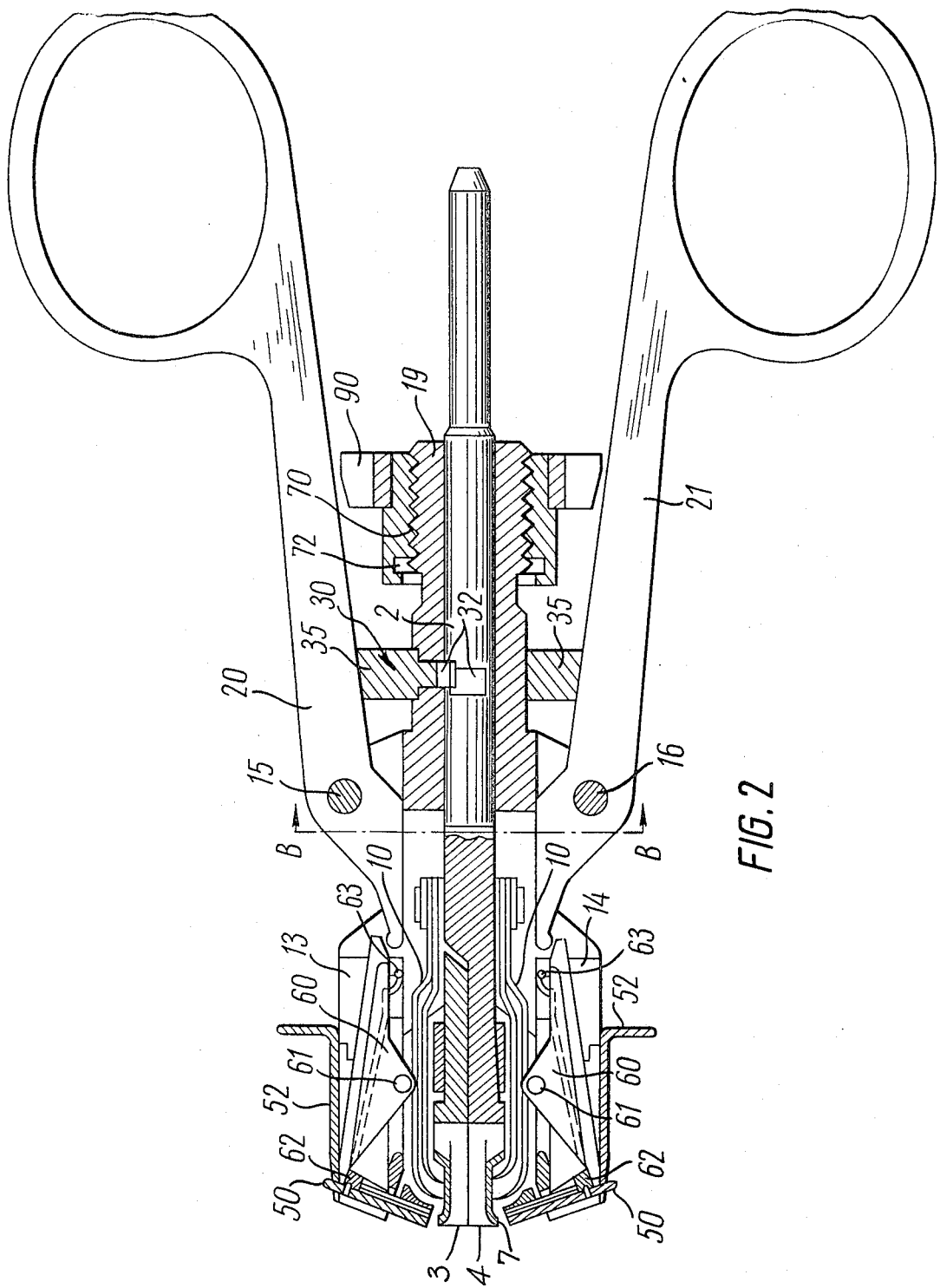

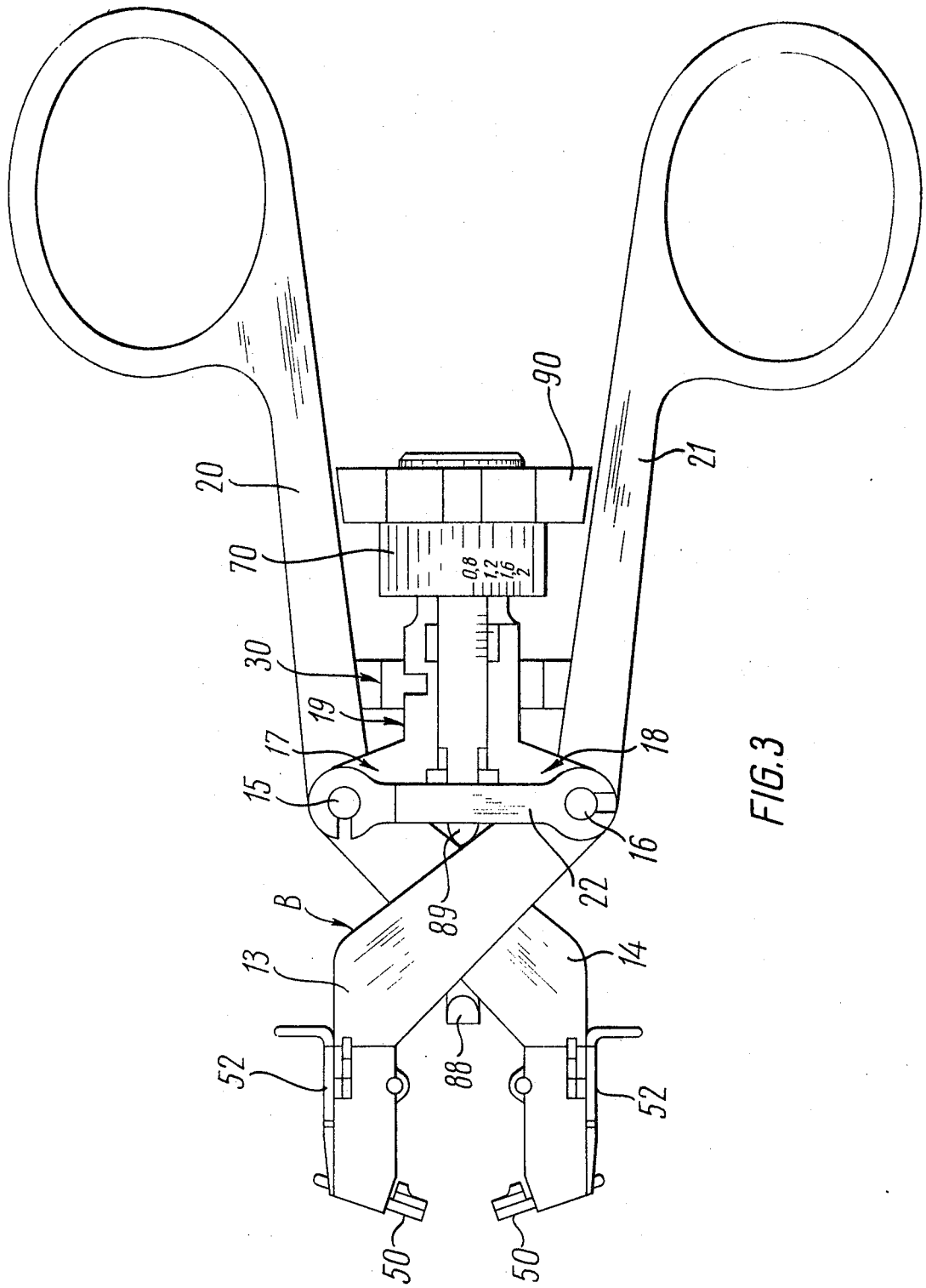

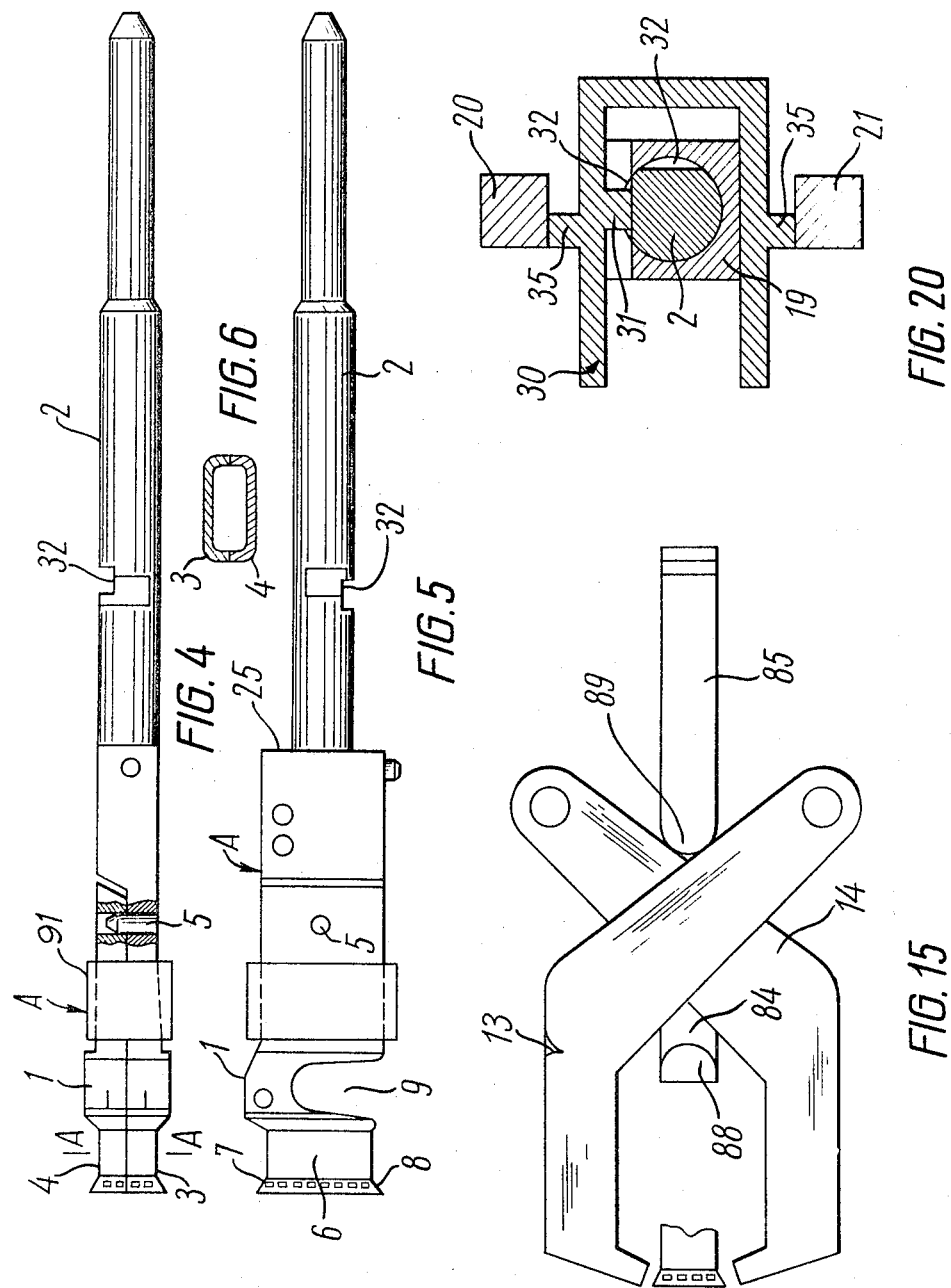

United States Patent Office 3,519,187
Patented July 7, 1970

3,519,187
INSTRUMENT FOR SUTURING VESSELS
Nickolai Nickolajevich Kapitanov, 8th St. Oktjabrskogo, Polja 5, Apt. 9; Natalija Petrovna Petrova, Second Peschanaja St., 8, Apt. 44; and Nina Vasiljevna Jurasova, Donskaja St., 44, Apt. 40, all of Moscow, U.S.S.R.
Continuation-in-part of application Ser. No. 365,325, May 6, 1964. This application Dec. 6, 1966, Ser. No. 599,565
Int. Cl. B25c 5/02, 5/16; A61b 17/11
U.S. Cl. 227—19                    6 Claims

ABSTRACT OF THE DISCLOSURE

Apparatus to suture vessels (arteries, the aorta and veins) and their soft prostheses by the "end-to-end" and "end-to-side" methods and to apply a patch on a defective portion of a vascular wall, without replacing parts and without changing the working procedure. The apparatus permits vessel-suturing without flanging or cuffing one of the vessel ends and when one of the ends is short which makes it possible to suture prostheses with sclerotic vessels.

---

This is a continuation-in-part application of our earlier application, Ser. No. 365,325 filed May 6, 1964 and now abandoned.

This invention relates to instruments for suturing vessels and to associated methods of suturing. The instrument is adaptable for suturing vessels such as arteries and veins or their soft prostheses by the "end-to-side" and "end-to-end" method, while also being suitable for applying a patch onto a defective portion of a vascular wall.

Certain surgical operations have become recently common, in which it is necessary to replace vessels such as arteries, the aorta and veins with soft prostheses by joining them by the "end-to-side" and "end-to-end" method, or to apply a patch on a defective portion of a vascular wall.

Instruments have been designed for suturing vessels by the "end-to-end" method and veins by the "end-to-side" method, but no instruments are known for suturing arteries and the aorta to the respective soft prostheses or vessels by the "end-to-side" method, or for applying a patch on a defective portion of a vascular wall.

Such methods can be effected by hand-suturing but this has often been known to cause undesirable effects.

The known instruments for suturing blood vessels by the "end-to-end" method is suitable only for suturing vessels having elastic walls which can be folded back on itself i.e. cuffed or flanged over a substantial length.

But surgical practice very often has to cope with cases where in making artificial vessels the vascular walls cannot be flanged, or where one of the vascular ends is short.

The known instruments for suturing vessels by the "end-to-side" method requires flanging of the wall of the main vessel and of the end of the other vessel. In cases where it is essential to flange only one end and then to insert this flanged end into an opening in the main vessel, said instrument permits the suturing of veins only.

Attempts to overcome the difficulties and shortcomings have heretofore been unsuccessful. The present invention, however, provides an instrument which successfully solves this problem.

In the instrument according to the invention, suturing is performed in oblique planes, making it possible to suture soft artificial vessels and natural vessels (arteries, the aorta and veins) not only by the "end-to-end" method, but also by the "end-to-side" method, while also enabling the applying of a patch on a defective portion of a vascular wall, all three kinds of suturing being carried out without replacing parts and without any change in the operating procedure.

The instrument according to the invention also permits suturing of vessels without flanging one of the ends, as well as suturing where one of the ends to be sutured is too short for normal suturing.

Other objects and advantages of the present invention will be readily understood from the following detailed description with reference to the accompanying drawing, wherein:

FIG. 2 is a side view of the instrument in partial section;

FIG. 3 is a side view of a stapling body of the instrument;

FIG. 4 is a side view of a rod of the instrument;

FIG. 5 is a plane view of the rod of FIG. 4;

FIG. 6 is a sectional view taken along lines A—A of FIG. 4;

FIG. 15 is an illustration of a detail of the instrument showing the operation for adjusting the clearance between end faces of the magazine and a flared part of the rod;

FIG. 20 is a sectional view taken along lines C—C in FIG. 1.

Figure 1:
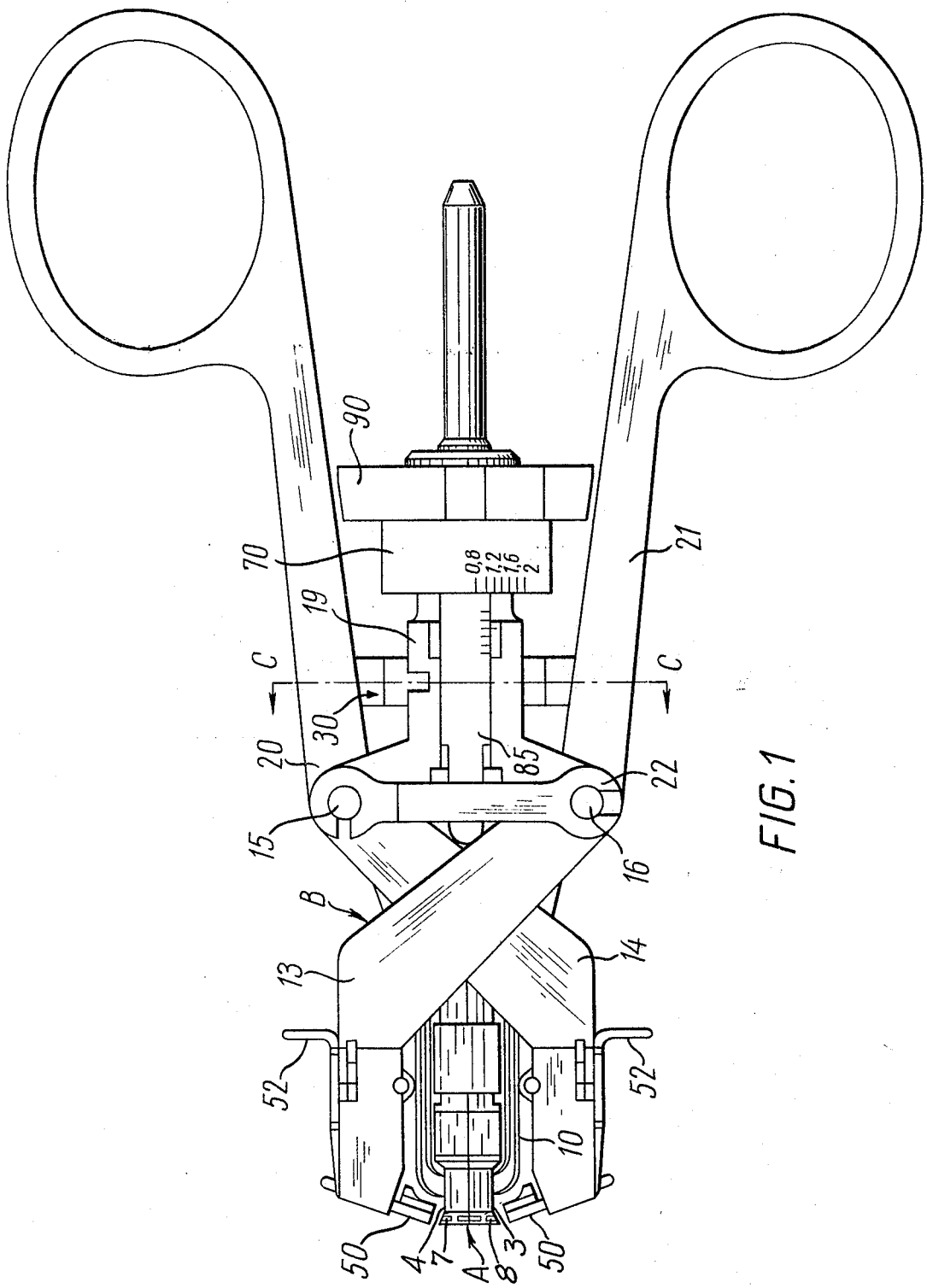
FIG. 1 is a side view of the instrument in assembled condition.

The instrument is basically constituted by two portions, namely a rod portion A and a stapling body B. The rod portion A is detachably engageable with the stapling body B.

The rod A is constituted by an end portion 1 and an extension 2. The end portion is comprised of two split sections 3, 4 which are secured together by a collar 91 which is engaged on inclined faces of the split sections to secure the same together. A pin 5 serves as an alignment guide for the sections 3, 4.

The split sections 3, 4 define a hollow portion 6 of rectangular section having a terminal flared flange 7, which is provided with a plurality of depressions 8 over its periphery.

In operation, a vessel to be sutured can be secured to the rod portion by insertion into the rectangular portion 6 via a notch 9 and folded back or cuffed around flange 7 such that the outer surface of portion 6 while the internal surface of the vessel faces outwards. A pair of clamps 10 are secured to the rod extension 2 for engaging the thus cuffed vessel to maintain the vessel against the supporting surface of the rectangular portion 6. The rod with the vessel thus secured is now adapted for engagement with a second vessel in order to achieve suturing by the "end-to-end" or "end-to-side" method.

Figure 16:
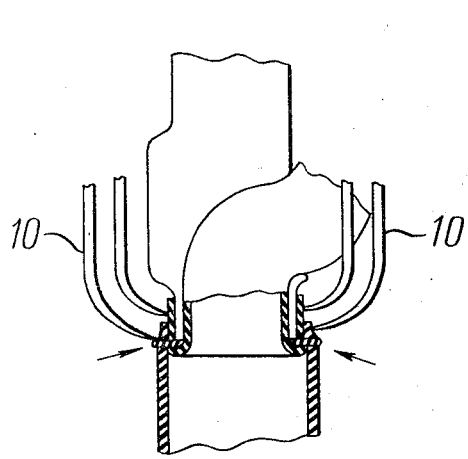
FIG. 16 is a diagrammatic representation of the method of "end to end" suturing with the instrument.
Figure 17:
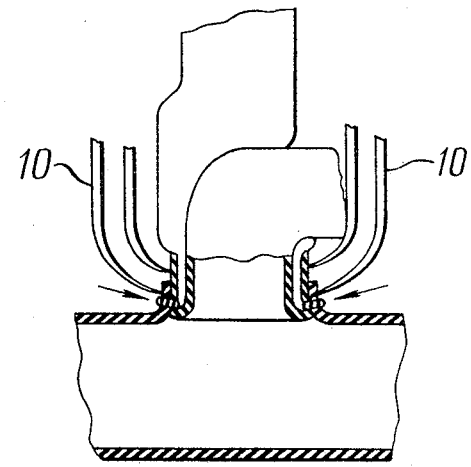
FIG. 17 is a diagrammatic representation of the method of "end to side" suturing with the instrument.

In FIG. 16 the rod and vessel secured thereto are inserted into the second vessel to achieve "end-to-end" suturing. In FIG. 17 the rod and vessel are inserted into the side surface of a second vessel in order to achieve "end-to-side" suturing. The clamps 10 are adapted for securing the edges of the second vessel as well against the outer surface of portion 6.

Figure 18:
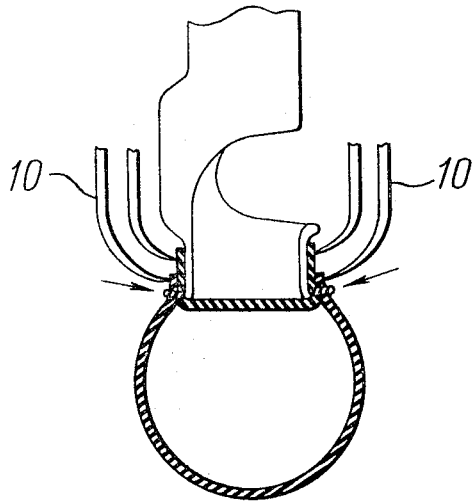
FIG. 18 is a diagrammatic representation of the method of applying a patch to a vascular wall with the instrument.

For applying a patch to a vascular wall, the patch is engaged over the mouth of the flared flange 7 and is folded back and engaged by clamps 10 as shown in FIG. 18. The patch is then inserted together with the rod into an incision in the vascular wall and the edges of the vascular wall overlap the edges of the vessel and are secured to the rod by the clamps 10.

Staples are driven approximately perpendicular to the inclined face of flange 7, as diagrammatically illustrated in FIGS. 16–18, in order to suture the edges of the vessels. The staples are driven by the staple body B in a manner which will be described hereinafter.

The staple body B is constituted by magazine holders 13, 14. The magazine holders have respective pairs of flanges 13a, 14a which are connected by pins 15, 16 to the flanges 17, 18 of a body 19. A pair of levers 20, 21 are also pivotally connected to the pins. A locking member 22 engages the ends of the pins and locks the levers, body and holders thereon.

Figure 19:
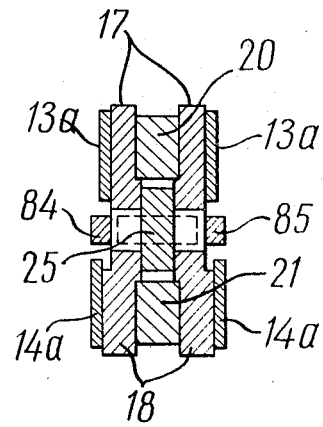
FIG. 19 is a sectional view taken along lines B—B in FIG. 2 showing two modes of engagement of the rod with the stapling body.

The body 19 is provided with a bore 23 which receives the rod extension 2. The body has a pair of slots 24 at right angles to one another for accommodating a rectangular portion 25 of the rod extension 2 in two positions in which the rod is respectively rotated 90° relative to the body. These two positions are shown in FIG. 19, one position being shown in solid lines, the other in dotted lines. Thus, the rod may be inserted and engaged with the body 19 of the staple body in one of two positions.

When the rectangular portion 25 of the rod extension is engaged in one of the slots, the rod and staple body are rotatably secured together.

Mounted on the body 19, is a transversely movable locking member 30 which has a depending flange 31 which is adapted for engaging a slot 32 in the extension rod 2. After the rod A has been inserted into the staple body, the locking member 30 can be transversely displaced to lock lug 31 in slot 32 to longitudinally secure the rod body in the staple body. The slots 32 in the rod extend at right angles to one another in order that the rod A can be longitudinally locked in the staple body B for both angular positions which the rod may assume relative to the staple body.

Additionally, the locking member 30 includes a pair of upstanding flanges 35 which can be positioned beneath the levers 20, 21 in order to prevent movement thereof towards one another. The significance of this will be discussed hereinlater.

Figure 7:
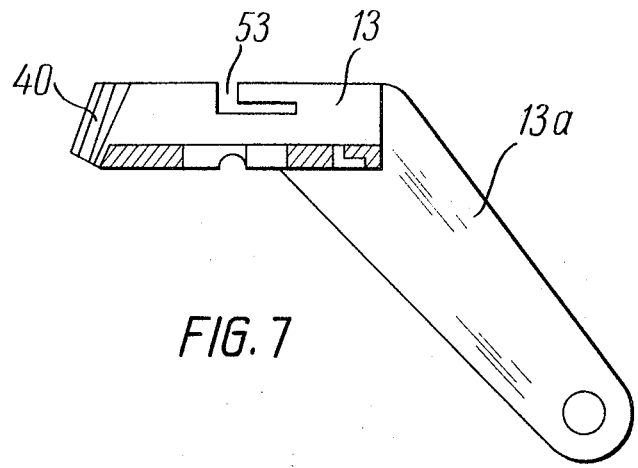
FIG. 7 is a side view partially in section of a holder of the instrument.
Figure 8:
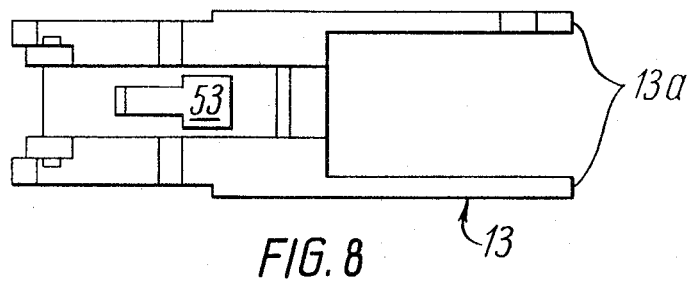
FIG. 8 is a plan view of the holder of FIG. 7.
Figure 9:
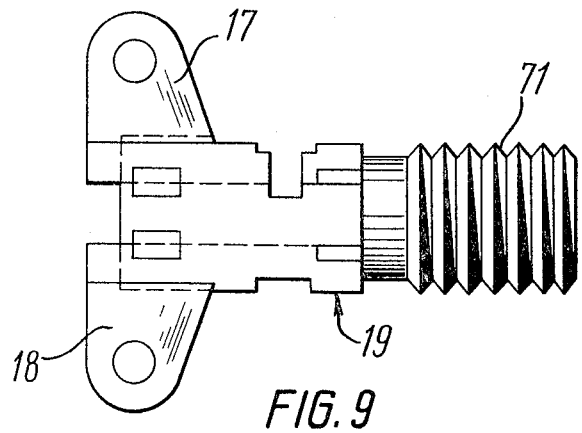
FIG. 9 is a side view of a stapling body of the instrument.
Figure 10:
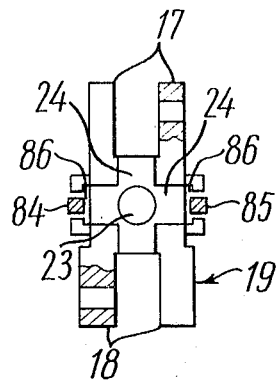
FIG. 10 is a front view of the stapling body of FIG. 9.
Figure 11:
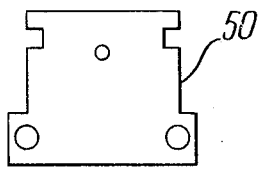
FIG. 11 is a side view of a staple magazine for the instrument of FIG. 1.
Figure 12:
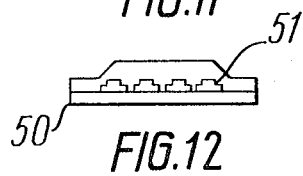
FIG. 12 is an end view of the magazine of FIG. 11.

The holders 13, 14 are provided with grooves 40 in which can be engaged magazines 50. The magazines are adapted for accommodating staples therein in grooves 51 (FIG. 12). A spring loaded locking latch member 52 is provided for each magazine and is supported in a slot 53 (FIG. 7) in a respective holder in order to engage the upper end of magazines 50 and secure the same. The latch member is retractable in order to enable removal of the magazines.

Pusher members 60 are pivotally secured to respective holders by pins 61 and the pushers have ends 62 which are engaged in the slots 51 of the magazines. A spring 63 engages a respective pusher to urge the same to a retracted position in the magazine. The pushers are pivotally movable about pins 61 under the action of levers 20, 21 in order to eject the staples from the magazines.

The magazines are supported in the holders so that they are substantially perpendicular to the inclined surface of the flange 7 of the rod and the staples will be driven perpendicular thereto.

Figure 13:
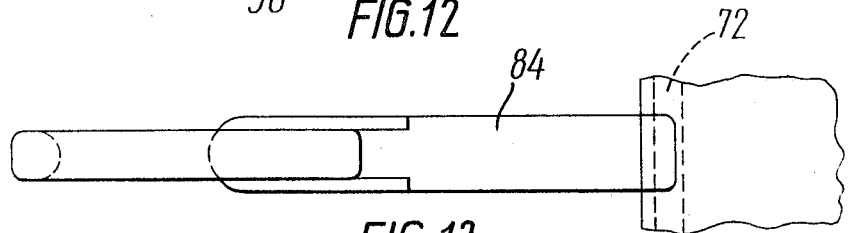
FIG. 13 is a side view of a clearance adjusting rod of the instrument.
Figure 14:
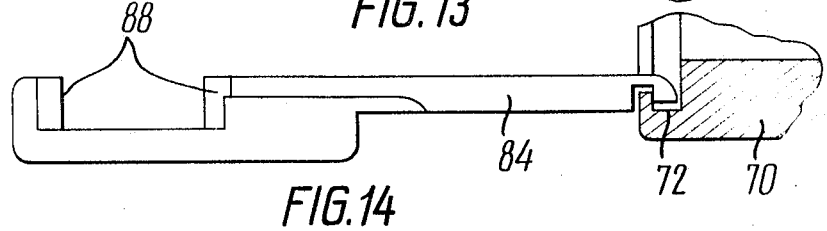
FIG. 14 is a plan view of the rod of FIG. 13.

The angular positions of the holders 13, 14 are adjustable in order to regulate the distance of the edge of the magazines from the surface of the flange 7. For this purpose, there is employed a nut member 70 which is threadably engaged on threaded end 71 of body 19. The nut is provided with a groove 72 which loosely accommodates the flanges of respective adjusting rods 84, 85 (FIGS. 13, 14). The rods are disposed on opposite sides of body 19 and are slidably engaged in respective channels 86 thereon. Rod 84 has two heads 88 which are in respective engagement with the members 13, 14 on opposite sides of the forked intersection thereof while rod 85 has only one head 89 which is in engagement with the members 13, 14 on one side of the forked intersection. By rotation of the nut, the rods are caused to axially move in channels 86 and open or close the holders 13, 14 by the action of the heads to adjust the spacing between the lower ends of the magazines and the surface of flange 7. A vane wheel 90 drives the nut member 70. The vane wheel is connected to the nut member with play whereby the vane wheel may be rotated in order to be out of the path of the levers 20, 21 during a suturing operation.

The instrument is operated as follows:

The rod A is extracted from the stapling body B. The magazines are loaded with staples and are secured in the holders by the latch member 52.

The end of a vessel or a prostheses is inserted through notch 9 into the hollow portion 6 and is cuffed or flanged over the flange 7 and secured to the outside of portion 6 by clamps 10. The vessel with the rod is then adapted for a suturing operation by any of the methods as shown in FIGS. 16–18 and described hereinbefore. Taking FIG. 16 as exemplary, the rod and vessel secured thereto, is then inserted into the end of a second vessel to which a suture connection is to be made. The wall of the second vessel extends over the edges of the first vessel and is secured by clamps 10.

The stapling body is then passed on rod A and secured therewith by means of locking member 30. Nut 70 is then rotated to adjust the position of holders 13, 14 and thereby the spacing of the ends of the magazines with the supporting surface of flange 7. The locking member 30 is then withdrawn from its locking position beneath the levers 20, 21 and the vane member 90 moved if necessary out of the path of movement of levers 20, 21. The levers 20, 21 are then brought together to pivotally move pusher member 60 and eject staples from the magazine. The legs of the staples pierce the vessels and are bent against the depressions 8 formed in the periphery of the flange 7 whereby the vessels are sutured together. On completion of this operation, the holders are moved apart by returning nut 70 to its original position.

By moving the locking member 30 laterally a sufficient distance so that the depending flanges 31 are free of the slots in the rod extension, the stapling body B is removed from the rod A.

The magazines are then replaced with loaded magazines and the staple body placed on the rod so that their relative angular position is now 90° with respect to their position in the first staple operation. The sequence of operation is then repeated in order to suture the remaining two sides of the vessels.

The above procedure is also followed when suturing by the "end-to-side" method or when replacing a defective portion of the vascular wall with a patch.

The present invention insures a hermetic union of the vessels and requires less time for a suturing operation then heretofore possible. This is of particular importance in operating on the major vessels of the thoracic and abdominal cavity.

The relatively small dimensions of the rod facilitate the use thereof in areas of small clearance and work space and thereby facilitate the surgical operation.

It is of significance to note that one of the vessel ends to be sutured does not require any cuffing or flanging and this is of great importance in operating on pathologically changed vessels i.e. sclerotic vessels and the like.

The instrument also permits suturing of vessels, one end of which is short and which otherwise could not be flanged. It is only necessary to form a collar on such short vessel so that it overlaps the cuffed edges of the other vessel.

Of further significance is the fact that the instrument permits all of the above types of vessels to be sutured while also permitting the application of patches without replacement of any parts and without any change in the operating procedure.

Although the present invention has been described with reference to a preferred embodiment, numerous variations and modifications are possible without departing from the scope and spirit of the invention as defined by the attached claims.

What is claimed is:

1. An instrument for suturing vessels with staples comprising a stapling body, a rod connectable with the body and including a hollow portion having an end with an outer flange defining an outwardly flared portion with an outer supporting surface which is inclined with respect to the longitudinal axis of the rod, said flange having depressions for bending the legs of staples, said depressions being located over the periphery of the outer supporting surface of the flared portion, means for securing at least one of the vessels to be sutured to said hollow portion, such that said vessel extends through said portion and the vessel edge is cuffed over said outer flange and is secured with its outer surface on said supporting surface with its internal surface facing outwards, the body with the vessel secured thereto being insertable into another vessel such that the edge of the latter vessel overlaps the edge of the first said vessel, magazines for staples mounted on said stapling body, pushers pivotally mounted on said body and in engagement with said magazines for ejecting staples therefrom, levers on said body for moving said pushers to eject staples in a direction perpendicular to the supporting surface of the hollow portion as a result of which the legs of the staples pierce the vessels and are bent against said depressions, and means for adjusting the position of said magazines relative to said rod to regulate the distance thereof from the supporting surface of the rod, said stapling body having a recess for receiving the rod in one of two positions which are rotated 90° relative to one another, said recess being constituted by two rectangular slots which are perpendicular to one another, said rod including a rectangular portion which is insertable in said slots.

2. An instrument for suturing vessels according to claim 1, wherein said levers are manually controlled and are pivotally connected to the body, said levers having first ends with handles and opposite ends operatively engaged with said pushers.

3. An instrument according to claim 1 wherein said stapling body comprises a pair of pivotal holders each supporting a respective magazine, said means for adjusting the position of the magazines relative to the rod comprising an adjustable member threadably mounted on the rod and engaging members acting on said holders to pivotally move the same as said adjustable member is moved on the rod.

4. An instrument according to claim 1 wherein said hollow portion includes two separable sections which are detachably joined together, said rod having a notch behind said hollow portion enabling insertion of a vessel into said portion through the notch.

5. An instrument according to claim 1 wherein said means for securing the vessels to be sutured to said hollow portion comprises clamps mounted on said body for engaging the ends of the vessels to hold the same on the hollow portion at the outer surface thereof.

6. An instrument according to claim 1 wherein said magazines are positioned in the body such that the staples are ejected therefrom perpendicular to said outer supporting surface of the flange and at a relatively small angle with respect to the axis of the rod.

References Cited

UNITED STATES PATENTS

| | | | |
|---|---|---|---|
| 959,738 | 5/1910 | Havener | 227—78 |
| 1,151,300 | 8/1915 | Soresi | 227—19 X |
| 2,344,071 | 3/1944 | Wilson | 227—19 X |
| 2,940,451 | 6/1960 | Vogelfanger | 227—19 X |
| 2,940,452 | 6/1960 | Smialowski | 227—19 X |
| 2,965,900 | 12/1960 | Inokouchi | 227—19 X |
| 3,144,654 | 8/1964 | Mallina | 227—19 |
| 3,316,914 | 5/1967 | Collito | 227—19 X |
| 3,366,301 | 1/1968 | Mallina | 227—19 |
| 3,317,105 | 5/1967 | Astafjev | 128—334 X |
| 3,388,847 | 6/1968 | Kasulin | 227—19 |

FOREIGN PATENTS

| | | |
|---|---|---|
| 1,159,127 | 12/1963 | Germany. |
| 366,627 | 2/1963 | Switzerland. |
| 376,223 | 5/1964 | Switzerland. |

WAYNE A. MORSE, JR., Primary Examiner

U.S. Cl. X.R.

128—334; 227—65, 78, 155